H. BUCHTER.
Molding Machine.
No. 9,358
Reissued Aug. 31, 1880.
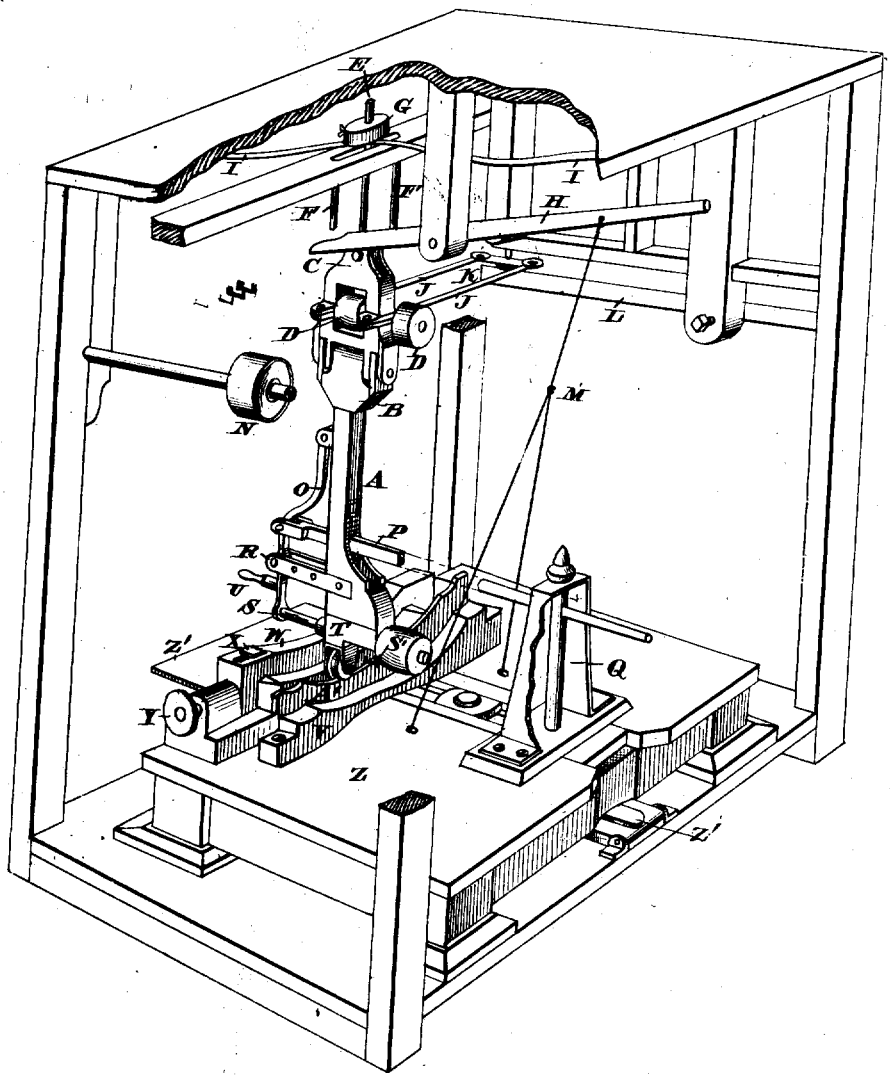
Attest:
H. L. Perrie
Geo. M. Pinckel
Inventor:
Henry Buchter,
by his attorney,
Wm. H. Pinckel

UNITED STATES PATENT OFFICE.

HENRY BUCHTER, OF LOUISVILLE, KENTUCKY.

MOLDING-MACHINE

SPECIFICATION forming part of Reissued Letters Patent No. 9,358, dated August 31, 1880.

Original No. 179,093, dated June 27, 1876. Application for reissue filed July 16, 1880.

*To all whom it may concern:*

Be it known that I, HENRY BUCHTER, of the city of Louisville, in the county of Jefferson and State of Kentucky, have invented a certain new and useful Improvement in Molding-Machines; and I do hereby declare that the following is a full, clear, and exact description thereof, which will enable others skilled in the art to make and use the same, reference being had to the accompanying drawing, forming part of this specification.

The drawing is a perspective view of the machine with a part of the cover and posts broken out, in order to show the interior arrangement of the several devices under it.

This my invention consists in a vertical railway-molding-machine hung to the frame or beam of the building, with a hinge-joint in the lever immediately under it, in order to enable the lever to swing or be turned in any direction to form the required style or shape of moldings to be cut, the particular motion required being produced by the shape of the curved way on which the machine partly rests.

The object of this invention is to provide a machine of universal application that can be operated in any direction, either to dress the top surface of plane circular pieces or form moldings on the edges in a regular curve form or in a wavy zigzag manner by the use of suitable cutters on the operating-spindle.

In the drawing, A is a vertical swinging lever for holding and giving direction to the cutter-spindle S and its pulley S′, which lever is made of wood and provided with suitable metal bearings on the lower end to receive the cutter-spindle, as shown.

O is a curved bar hinged to the side of the lever A and serving as a bearing for the end of the cutter-spindle, and also as a convenient point in which to insert a handle to operate the machine. This bar O is so arranged as to be drawn out for convenience in changing cutters.

U is the operating-handle.

P is a lever connected with the swinging lever A, for assisting in steadying the machine while in operation.

Q is a stand through the central part of which the lever P is made to pass loosely, so as to turn with the motion of the machine.

R is a brace for supporting the curved bar O.

S is the cutter-spindle, and S′ the pulley by which it is driven, the cutters not being shown on the spindle.

T is a flanged guide-roller arranged in bearings under the spindle S on the lower end of the lever A, and working on the curved way A′, by means of which form is given to the article to be operated upon.

V is the block carrying the curved way A′, on which the machine rests in part, and by which it is guided in its operation. This curved way A′ is intended to be changed in form to suit the kind of molding to be cut.

W is a block for supporting the article to be operated upon, the article being held in its place thereupon by the jaw X when said jaw is closed upon it by the screw Y.

Z is the table on which the machine rests, which is made in form as shown in the drawing.

B is a metal flange or head-piece on the upper end of the swinging lever A, constituting a part of the hinge-joint attachment to the clevis above.

C is a clevis-shaped block of metal arranged to receive the shaft of the driving-pulleys D D by means of bearings formed in the arms below, as shown in the drawing. The ends of these arms below the bearings constitute the flanges of the hinge-joint of the lever A.

D D are the driving-pulleys by means of which motion is transmitted to the cutter-spindle through its pulley S′ below.

N is the main pulley for driving the machine.

E is a guiding-spindle at the top of the machine, from which the swinging lever A hangs.

G is an adjustable collar on the spindle E, by which the device is hung upon springs I I, to regulate the weight on the cutters.

F F are pins passing up through the beam into a plate above, through which the spindle E passes, they being used as a means for raising the machine when required. H is the lever by which these pins are operated.

J J are bars hinged to the bearings of the clevis to counteract the lateral strain caused by the driving-belt. These last-named bars are also hinged to the cross-bar K at the other end, so as to yield to the change of position in operating the machine.

L is a spring for obtaining the strain required to counteract that caused by the belt. M is a cord connecting the lever H with the treadle Z′, for use in raising the machine to change, insert, and remove the article to be operated upon.

My machine being constructed as above described its operation is as follows: Motion may be imparted to the cutter-spindle S by means of a belt over the pulleys S′ and D and connection with the main driving-pulley N. The material to be operated upon is clamped upon the bed W, and the swinging lever-pulley T rests upon a former or curved way, A, of substantially the outline or profile of the finished article. Cutters suitable for the work to be done having been placed upon the cutter-spindle in the end of the swinging lever and motion imparted to the cutter-spindle, the swinging lever is moved over the material by means of the handle U until the cutters give to the article the profile formed in the curved way A′. The swinging lever being jointed at D, and also being rotatable on the pin E, sufficient latitude of movement is given to permit the proper manipulation of the cutters. The swinging lever is upwardly movable by means of the lever H, connected by cords M with the treadle Z′, said lever operating upon the pins F, which are inserted in the beam through which the pin E passes and suspends said lever. The guideway A′ determines the shape of the finished article, and is changeable to adapt the machine for a variety of work. The springs I, from which the lever is suspended, afford a yielding bearing, whereby the cutters are saved from injurious shocks and permitted to work easily over the material.

Having thus fully described the nature and object of this my invention, what I claim as new, and desire to secure by Letters Patent, is—

1. In a vertical swinging molding-machine, the combination of the lever A, curved bar O, and lever P, with its stand Q, brace R, tool or cutter spindle and pulley-guide roller T, and handle U, constructed and arranged to operate substantially as and for the purpose set forth.

2. In combination with the vertical swinging lever A, the head-piece B and clevis C, with its pulleys D D, spindle E, pins F F, collar G, lever H, springs I I, bars J J and K, springs L, and cord M, arranged to operate substantially as and for the purpose set forth.

3. In a vertical swinging molding-machine, a jointed lever suspended upon yielding bearings and carrying the cutters, and adapted to be turned in the directions necessary to form the required style or shape of moldings, in combination with a guide-roller and a guideway, A′, to govern the shape of the article, substantially as described.

4. A swinging cutter-holding lever, in combination with a pin, E, an adjustable collar, G, and springs I, forming adjustable spring-bearings therefor, substantially as described.

5. The combination of a work-holder, a vertically-movable cutter-holder, and means to support the same with pins F F, a lever, H, cords M, and treadle Z′, for raising the cutter-holder from the work-holder to permit the insertion and removal of the work, substantially as described.

6. A swinging cutter-holding lever and means for suspending the same, in combination with bars arranged in connection therewith to counteract the lateral strain of the driving-belt, substantially as described.

7. The combination of a swinging cutter-holder, means for suspending the same, bars arranged in connection therewith to counteract lateral strain, a cross-bar for connecting the first-named bars to admit of change of position, and a governing-spring, L, substantially as described.

To the above specification of my invention I have signed my name this 6th day of July, A. D. 1880.

Witnesses: HENRY BUCHTER.
C. HEWITT,
FRANK PARDON.